United States Patent
Fretwell

(10) Patent No.: US 6,769,450 B2
(45) Date of Patent: Aug. 3, 2004

(54) VALVE SYSTEM

(75) Inventor: Kevin Fretwell, Sheffield (GB)

(73) Assignee: Bestobell Valves Ltd., Sheffield (GB)

( * ) Notice: Subject to any disclaimer, the term of this patent is extended or adjusted under 35 U.S.C. 154(b) by 0 days.

(21) Appl. No.: 10/092,894

(22) Filed: Mar. 7, 2002

(65) Prior Publication Data

US 2002/0124881 A1 Sep. 12, 2002

(30) Foreign Application Priority Data

Mar. 8, 2001 (EP) .............................................. 01302113

(51) Int. Cl.⁷ .............................................. E03C 1/10
(52) U.S. Cl. ...................................... 137/218; 137/107
(58) Field of Search ................................. 137/107, 218

(56) References Cited

U.S. PATENT DOCUMENTS

| | | | | |
|---|---|---|---|---|
| 3,491,788 A | * | 1/1970 | Kilayko | 137/218 |
| 4,232,704 A | * | 11/1980 | Becker et al. | 137/218 |
| 4,478,236 A | * | 10/1984 | Neuzeret et al. | 137/218 |
| 5,056,549 A | * | 10/1991 | Bouilloux et al. | 137/218 |

* cited by examiner

*Primary Examiner*—Gerald A. Michalsky
(74) *Attorney, Agent, or Firm*—Andrus, Sceales, Starke & Sawall, LLP

(57) ABSTRACT

A valve system, for controlling the dispensing, in use, of a fluid. The valve system comprises first and second valve members which define a cavity therebetween. The first valve member has a closed position and an open position and provides a seal between an inlet of the valve system and the cavity while in the closed position and allows passage of fluid from the inlet to the cavity while in the open position. The second valve member has a closed position and an open position and provides a seal between the cavity and an outlet of the valve system while in the closed position and allows passage of the fluid from the cavity to the outlet while in the open position. Hence the valve members control the passage of fluid through the valve system. The valve system further comprises means for controlling venting of the cavity dependant upon the relative values of the valve system inlet and outlet pressures.

7 Claims, 2 Drawing Sheets

VALVE SYSTEM

CROSS REFERENCE TO RELATED APPLICATION

The present application claims priority from European Patent Application No. 01302113.4, filed Mar. 8, 2001.

SUMMARY OF THE INVENTION

This invention relates to valve systems for fluid delivery systems.

A generic fluid delivery system may comprise a reservoir containing fluid to be delivered, a feed pump to maintain delivery pressure through delivery pipes, a control valve and a target tank to be filled.

BRIEF DESCRIPTION OF THE INVENTION

One example of such a system has a control valve used to control the delivery of a gas, such as $CO_2$, from the reservoir to the tank whilst preventing back-flow of gas into the delivery reservoir. This back-flow could cause potentially contaminating substances to be transmitted from the tank to the delivery reservoir, in turn, this could cause pollution of the "pure" source gas in the reservoir, potentially contaminating future delivery sites.

Prior art valves in known gas delivery systems contain a single check valve and failure of this valve has been known to lead to such contamination of the delivery reservoir. As such valve systems are incorporated into mobile delivery systems which tour various industrial sites, valve failure and subsequent contamination has been known to occur at a heavy industrial site, where contamination is not a significant issue, this contamination has then been supplied to an alternative site where the gas is used in products for human consumption, causing severe safety problems.

Alternative prior art valve systems have incorporated two check valves rather than one, to allow for redundancy should one fail. In such systems, if the valve adjacent to the outlet fails, the space between the valves may be vented. However, when this cavity is vented, the check valve adjacent to the inlet is opened due to the pressure difference that then occurs. As a result of this opening valve constant venting of the delivery reservoir will occur and inventory will be lost. Whilst prevention of contamination of the delivery reservoir may be achieved, if resumption of a suitable pressure difference is not resumed rapidly not only may a significant portion of the inventory be lost to atmosphere but the venting jet may cause disruption or a safety hazard in the vicinity of the equipment.

It is an aim of the present invention to overcome the contamination problems of the earlier prior art without introducing a constant venting condition.

According to the present invention there is provided a valve system, for controlling the dispensing, in use, of a fluid, the valve system comprising first and second valve members defining a cavity therebetween, the first valve member having a closed position and an open position and providing a seal between an inlet of the valve system and the cavity whilst in the closed position and allowing passage of fluid from the inlet to the cavity whilst in the open position and the second valve member having a closed position and an open position and providing a seal between the cavity and an outlet of the valve system whilst in the closed position and allowing passage of the fluid from the cavity to the outlet whilst in the open position, thereby controlling the passage of fluid through the valve system, the valve system further comprising means for controlling venting of the cavity dependant upon the relative values of the valve system inlet and outlet pressures.

The valve members may be automatically returned to their closed positions by biassing means, these biassing means may be provided by springs. The venting of the internal cavity may be controlled by use of a diaphragm valve.

BRIEF DESCRIPTION OF THE DRAWING

An example of the present invention will now be described with reference to the accompanying drawings in which.

DETAILED DESCRIPTION OF THE INVENTION

Figure 1A:
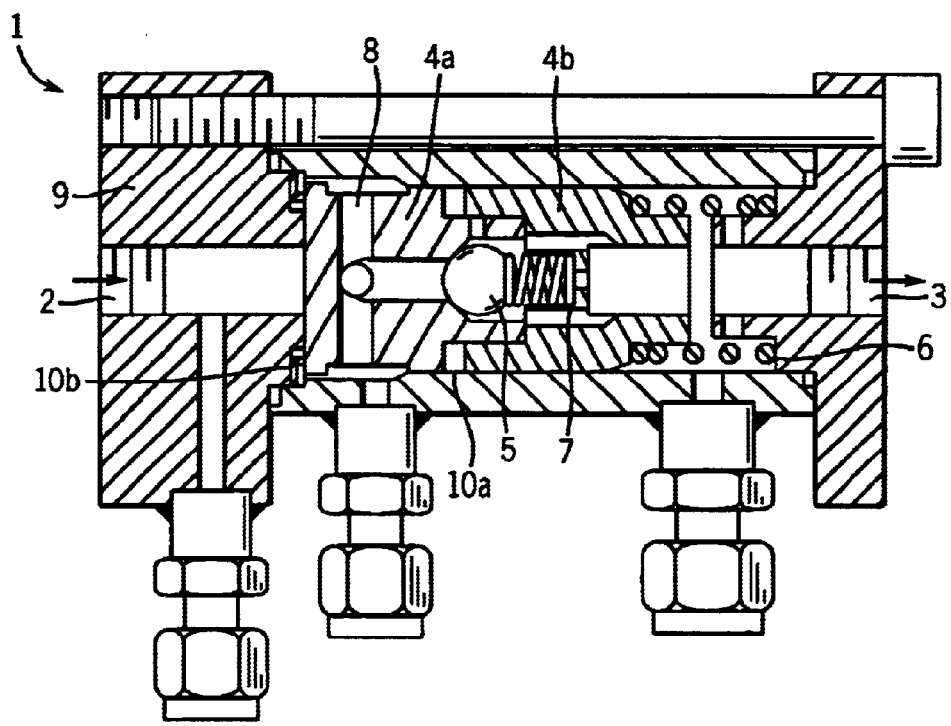
FIG. 1A is a schematic diagram of a primary valve forming part of a system according to the invention in its closed position.

A valve system is shown in FIG. 1A in a no-flow position. The system 1 has a housing 9 provided with an inlet 2 and an outlet 3, between which are positioned a first valve member 4 and a second valve member 5. The first valve member comprises two parts 4a, 4b such that the remainder of the system can be more easily assembled. A seal 10a is provided between the two parts 4a, 4b which, in use, are permanently joined to one another. The second valve member 5 is a spherical member and is generally located within the cavity formed by valve parts 4a and 4b. A biassing means 7 is positioned adjacent to valve member 5 to maintain the seal between valve part 4a and valve member 5 such that an internal cavity 8 is formed.

A further biassing means 6 is provided between valve part 4b and the housing 9 adjacent to the outlet 3 such that sealable contact is maintained between valve part 4a and the housing 9 adjacent to the inlet 2. This contact is further assisted by the provision of an additional seal 10b.

Figure 1B:
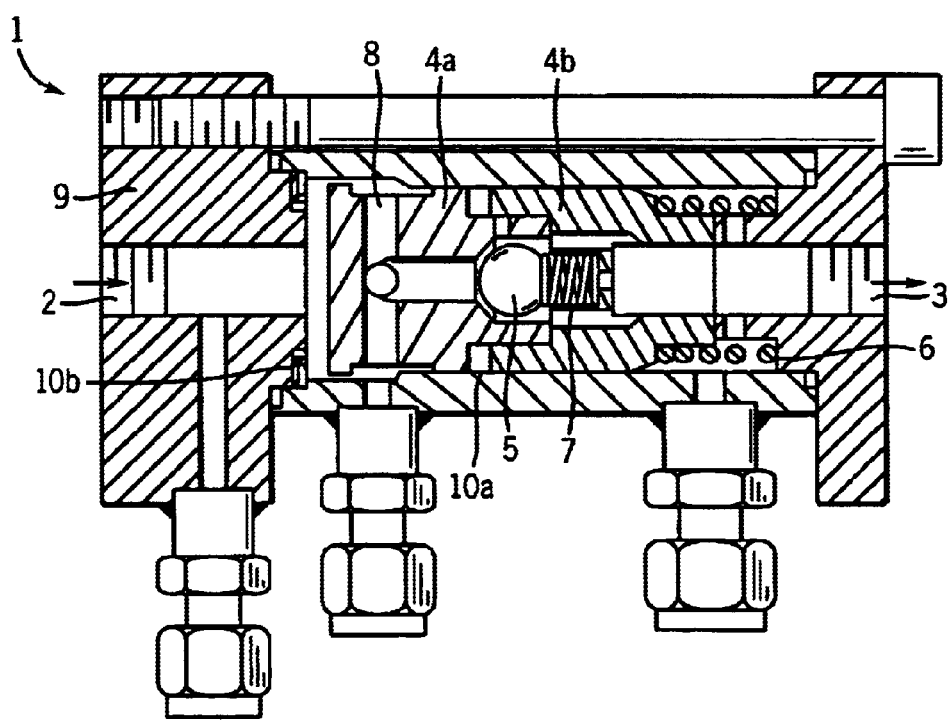
FIG. 1B is a schematic diagram of the primary valve of FIG. 1A in its open position.

The valve members 4, 5, as shown in FIG. 1A, are retained in their closed positions by their associated springs 6, 7. FIG. 1B illustrates the valve system of FIG. 1A during gas delivery. During delivery the pressure of gas at the inlet 2 is increased such that the first valve member 4 is driven towards the outlet 3, compressing spring 6. The gas then passes around the first valve member 4 into the cavity 8 and acts upon valve member 5. Spring 7 is also compressed as valve member 5 is moved toward the outlet, such that gas can flow through the valve system. This condition is maintained until pressure at the inlet 2 is once again reduced.

If the outlet 3 pressure increases to be equal or greater in magnitude to that at inlet 2, for example, due to failure of a feed pump (not shown) which may be located upstream of the valve system, during delivery of gas, the valve members 4, 5 will automatically return to their closed positions and thus prevent any back-flow and subsequent contamination of the delivery reservoir (not shown). The seal 10b is additionally provided to maintain the integrity of the cavity 8.

The cross sectional loading area of valve members 4 and 5 as seen from the outlet 3 is greater than the equivalent loading area of valve part 4a as seen from the inlet 2. If the pressure at the inlet 2 and outlet 3 become equal, the resultant force on the valve members 4, 5 will act towards the inlet. This force, in conjunction with the spring mechanisms 6 and 7, will return valve members 4 and 5 to their closed positions as shown in FIG. 1A.

Figure 2:
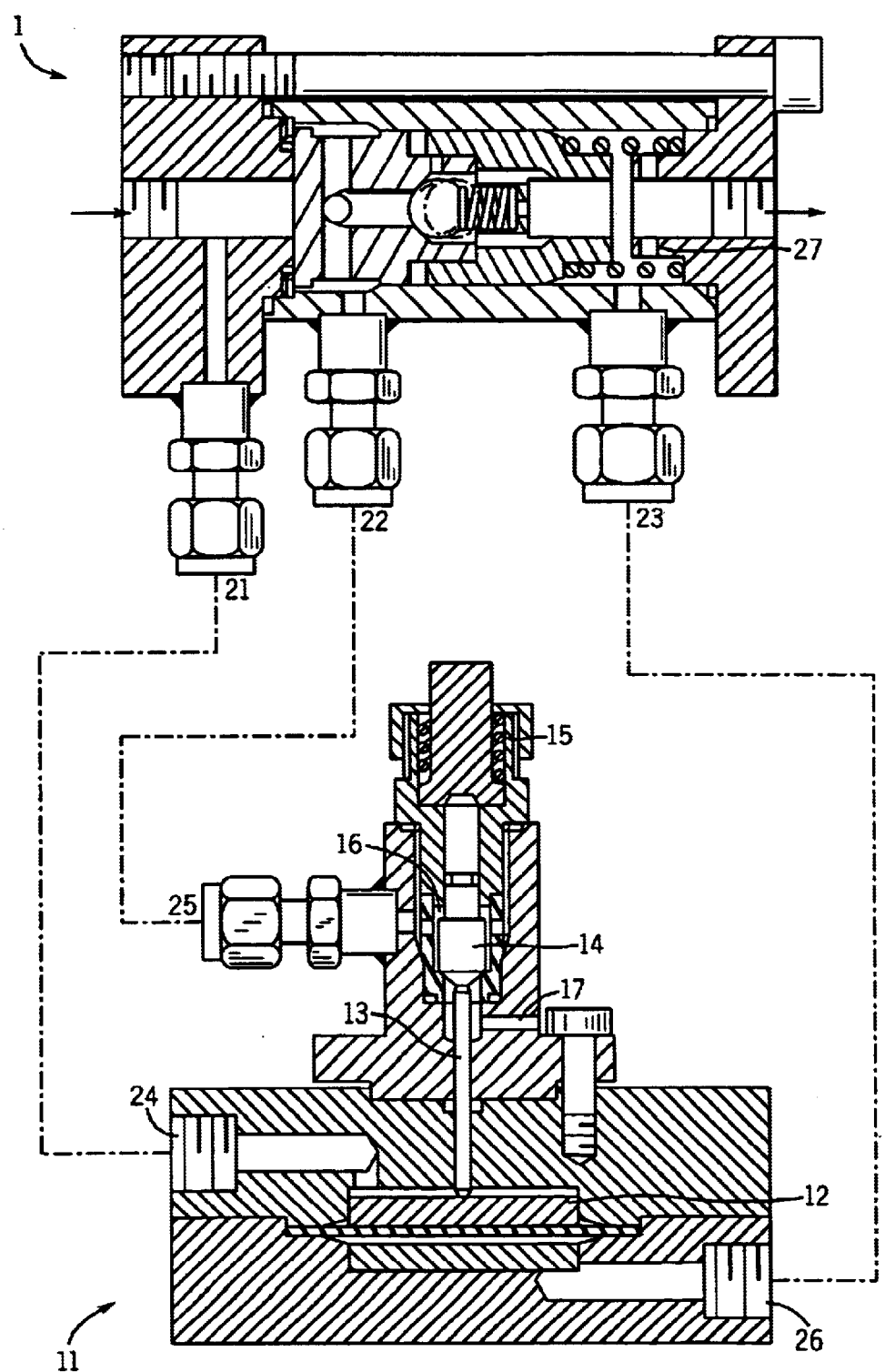
FIG. 2 is a schematic diagram of the primary valve system of FIGS. 1A and 1B, attached to a controlling diaphragm valve to provide a system according to the invention.

FIG. 2 illustrates the primary valve system 1 of FIGS. 1a and 1b connected to a secondary diaphragm valve 11. The primary valve system 1 further comprises three ports 21, 22, 23 connected to the inlet 2, the cavity 8 and the outlet 3 respectively. A hole 27 is provided in valve part 4b to allow permanent contact between the outlet 3 and port 23.

The diaphragm valve 11 comprises a housing 19 with an inlet 24 and an outlet 26. A slidable disc 12 is located between the inlet 24 and the outlet 26. This disc 12 is in contact with a rod 13 which, in turn, is connected to a stopper 14. The stopper 14 is held in place, within a cavity 16, by a biassing means 15. The cavity 16 is connected to cavity 8 of the primary valve system via ports 25 and 22. A vent 17 is provided within housing 19.

The location of disc 12 is governed by the pressure difference between the inlet 2 and outlet 3 in combination with the spring 15. If the disc 12 is driven towards the spring 15, the rod 13 and the stopper are also translated and the spring 15 is compressed. This motion of the stopper 14 causes any gas in cavity 16 to be released to atmosphere through the vent 17.

The three connection ports 21, 22, 23 are always active, two of the ports 21, 22 are always directly connected to the inlet 2 and the cavity 8 respectively. A hole 27 is provided in valve member 4b adjacent to the outlet 3 and spring 6 to allow a permanent connection between the outlet 3 and port 23. Consequently the diaphragm valve inlet 24 and outlet 26 will experience the same pressures respectively as those of the primary valve inlet 2 and outlet 3.

Under normal delivery conditions (as illustrated in FIG. 1B) the disc 12 will be located as shown in FIG. 2, cavity 16, and therefore cavity 8, will not be vented to atmosphere. If, however, the inlet 2 pressure decreases in relation to the outlet 3 pressure, as described earlier, the valve members 4, 5 will return to their closed position and a pocket of gas may be captured in cavity 8. As the outlet 3 pressure increases disc 12 will be moved to compress spring 15 and the venting of cavity 8 will be activated via cavity 16 and outlet 17, thus expelling any potentially contaminated gas.

The pressure will consequently be reduced in cavity 8 which may lead to a pressure difference across the valve part 4a. The spring 6 prevents the valve member 4 from opening until delivery can be resumed. At which point the inlet 2 pressure will be sufficiently increased to both open the valve members 4, 5 and deactivate the venting process which is controlled by the diaphragm valve 11.

What is claimed is:

1. A valve system for controlling the dispensing, in use, of a fluid, the valve system comprising first and second valve members defining a cavity therebetween, the first valve member having a closed position and an open position and providing a seal between an inlet of the valve system and the cavity while in the closed position and allowing passage of fluid from the inlet to the cavity while in the open position and the second valve member having a closed position and an open position and providing a seal between the cavity and an outlet of the valve system while in the closed position and allowing passage of the fluid from the cavity to the outlet while in the open position, thereby controlling the passage of fluid through the valve system, the valve system further comprising means for controlling venting of the cavity dependant upon the relative values of the valve system inlet and outlet pressures;

wherein the second valve member is located within the first valve member.

2. A valve system according to claim 1, wherein at least one of the valve members is automatically returned to its closed position by a biasing means.

3. A valve system according to claim 2, wherein the biasing means is provided by a spring.

4. A valve system according to claim 1, wherein the means for controlling venting of the cavity is provided by a diaphragm valve.

5. A valve system according to claim 1, wherein the first valve member comprises two parts.

6. A valve system according to claim 1, wherein the second valve member comprises a ball valve.

7. A valve system according to claim 1, further comprising seals to maintain the integrity of the cavity.

* * * * *